Figure 1:
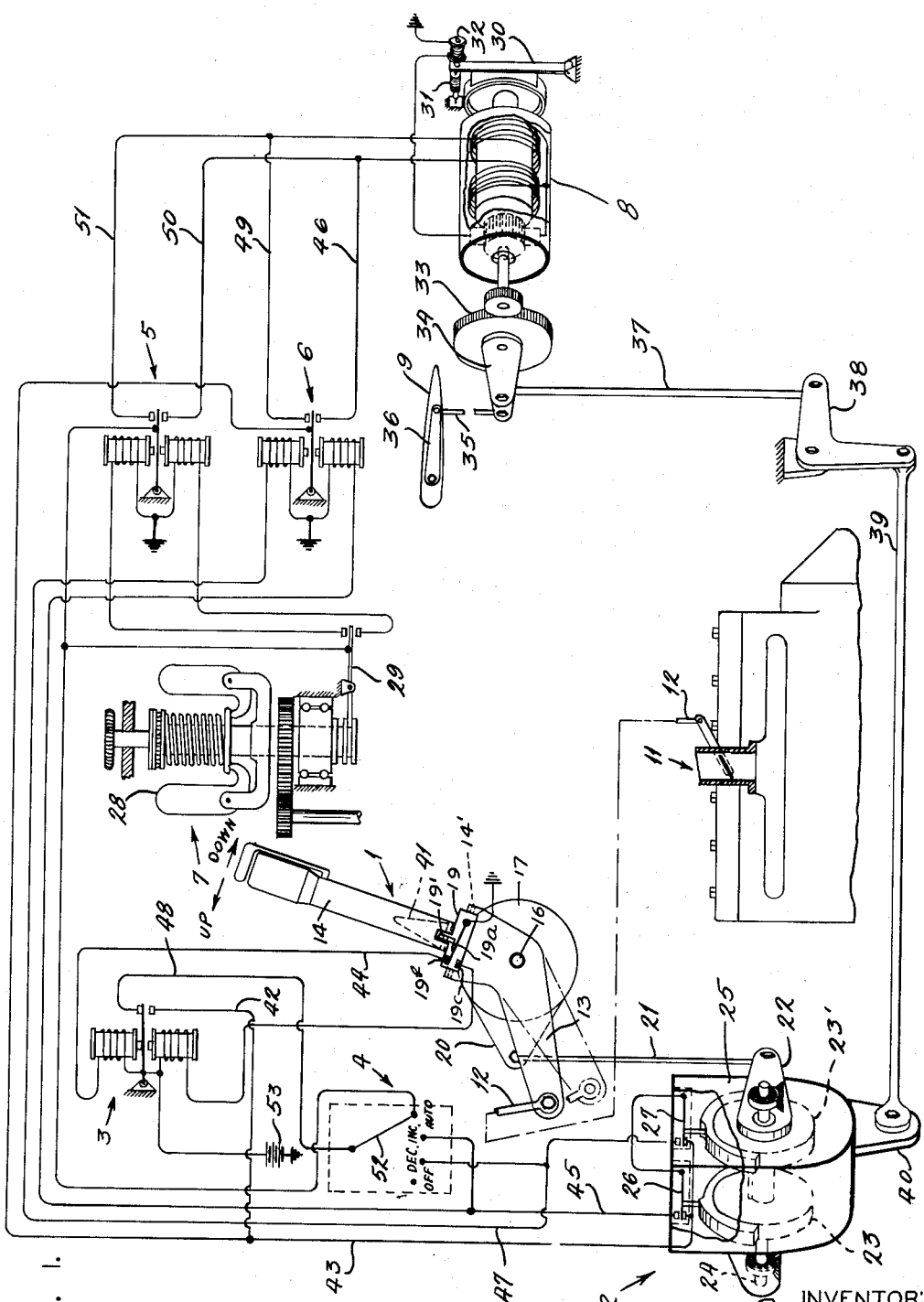

Sept. 14, 1954

T. J. PAGE 2,689,010

HELICOPTER ROTOR PITCH CONTROL

Filed June 14, 1948

3 Sheets-Sheet 1

INVENTOR:
Thomas J. Page,
By Carr & Carr & Gravely,
HIS ATTORNEYS.

Sept. 14, 1954   T. J. PAGE   2,689,010
HELICOPTER ROTOR PITCH CONTROL
Filed June 14, 1948   3 Sheets-Sheet 2

INVENTOR:
Thomas J. Page
By Carr & Carr & Gravely
HIS ATTORNEYS.

Sept. 14, 1954  T. J. PAGE  2,689,010
HELICOPTER ROTOR PITCH CONTROL
Filed June 14, 1948  3 Sheets-Sheet 3

INVENTOR:
Thomas J. Page,
By Carr & Carr & Gravely,
HIS ATTORNEYS.

Patented Sept. 14, 1954

2,689,010

UNITED STATES PATENT OFFICE 2,689,010

HELICOPTER ROTOR PITCH CONTROL

Thomas J. Page, St. Louis, Mo., assignor to McDonnell Aircraft Corporation, St. Louis, Mo., a corporation of Maryland Application June 14, 1948, Serial No. 32,881

9 Claims. (Cl. 170—135.74)

This invention relates to helicopters and is more particularly directed to a mechanism to control the pitch of the rotor blades and the throttling of the engine for driving the rotor.

The object of this invention is to provide a mechanism jointly operable so that the pitch of the rotor blades and the throttle for the rotor may be controlled simultaneously.

Another object of this invention is to provide a pitch control means for the rotor blades that is responsive to the speed of the rotor or to a manual control therefor with the two controls being jointly or selectively operable.

Still another object of the invention is to provide a rotor pitch control means that is responsive to the speed of the rotor or to a manual control that includes means to visually inform the pilot of the approximate pitch of the rotor blades.

Yet another object of the invention is to provide a reversible motor for changing the pitch of the rotor blades for a helicopter wherein a comparatively slow change of pitch adjustment may be accomplished by causing the motor to be responsive to the speed of the rotor and which is instantaneously responsive to a manual control for the pitch changing motor.

Another and further object of the invention is to provide a reversible motor for changing the pitch of the rotor blades for a helicopter in which the rotor is responsive to a single reversing relay that is controllable by a manually operable combination switch and throttle mechanism and in which the rotor controls the operation of the pitch changing motor so that if the rotor speed decreases below a predetermined value, the rotor blades will be positioned for auto-rotation.

Figure 2:
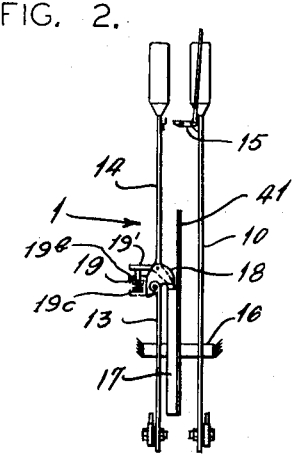
Figure 4:
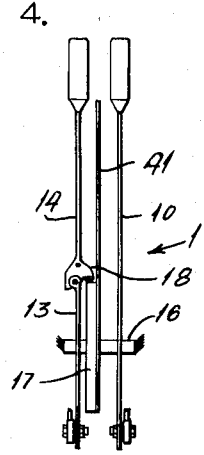
Figure 5:
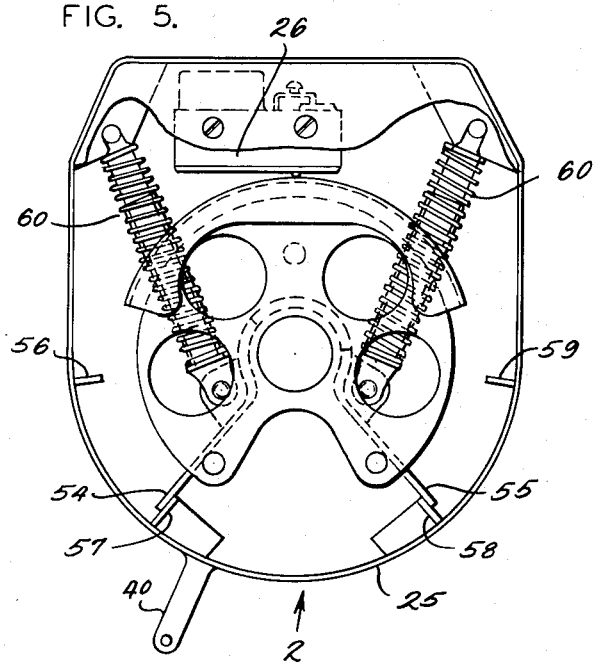
Figure 6:
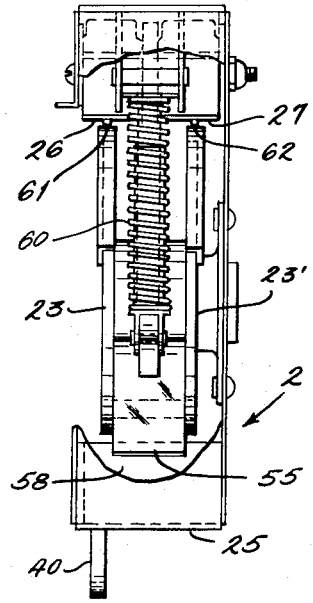
Figure 7:
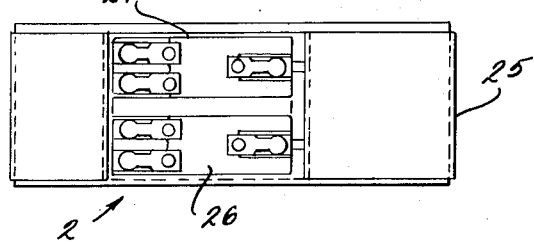
Figure 8:
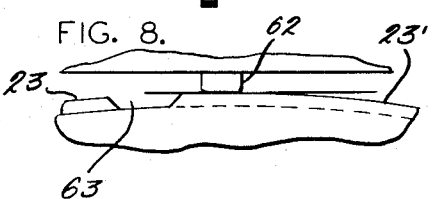
Figure 3:
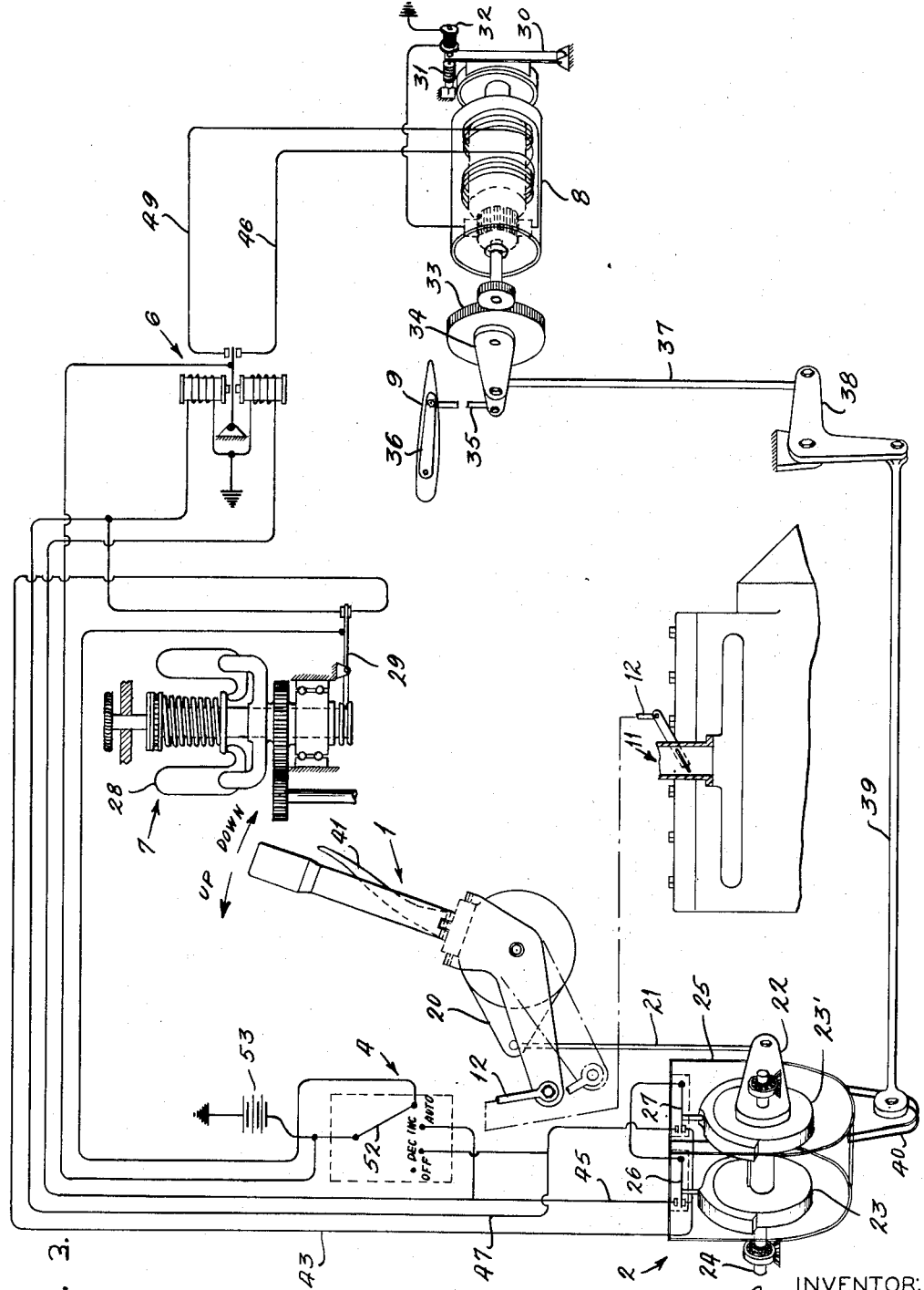

In the drawings:

Fig. 1 is a schematic view of the invention,

Fig. 2 is a side elevational view of the combination throttle and pitch control lever mechanism, Fig. 3 is a diagrammatic view of a modified pitch control mechanism, Fig. 4 is a side elevational view of the combination throttle and pitch control mechanism shown in Fig. 3, Fig. 5 is an end elevational view of the servo switch shown in Figs. 1 and 3 with the cover partly removed, Fig. 6 is a side elevational view of the servo switch with part of the cover removed to show details, Fig. 7 is a plan view of the servo switch; and Fig. 8 is an enlarged view of the servo switch operating cams.

The elements interconnectable to provide the necessary controls consist of a combination throttle lever and pitch control lever assembly 1, a servo or follow-up switch assembly 2, a selector relay 3, a manually operable selector switch 4, and relays 5 and 6, one of which is controllable by the lever assembly 1 and the other of which is controllable from the rotor assembly 7. The relays 5 and 6 control a reversible pitch changing motor 8 that is operatively associated with a rotor blade 9 connectable to rotor assembly 7. The foregoing constitute the essential elements of the device and when suitably interconnected, as will be set forth hereinafter, will control the pitch of the rotor blade 9, only one blade of which is illustrated in the Fig. 1 disclosure of the invention.

The handle assembly 1 comprises a lever 10 that is operatively connected to a throttle valve 11 for a suitable prime mover, such as an internal combustion engine, and is connected to said throttle valve by suitable linkage 12. Mounted on the same axis as the lever 10 is another lever 13 which has pivoted thereon a handle 14 in a manner such that lever 14 may be moved toward the lever 10 and under certain conditions may be latched together by means of a latching device 15. The levers 10 and 13 are mounted for rotation on shaft 16 and operatively associated with lever 13 and rotatably supported on the shaft 16 is a disk 17. The handle 14 is provided with a brake shoe 18 that is engageable with the disk 17 so that the two may rotate together under certain conditions of operation. A single-pole double-throw switch 19 is assembled on lever 13 and is controllable by a lever connected to shoe 18 so that the switch 19 may be operated thereby.

Referring to Figs. 1 and 2, the levers 10 and 13 rotate about shaft 16 either independently or together. Independent rotation of lever 13 is obtained through lever or handle 14, in turn, pivotally connected at pin 14' to be movable angularly relative to lever 10. The axis of pin 14' is at right angles to the axis of shaft 16. Thus, if handle 14 is moved counterclockwise (Fig. 2) about pin 14', the brake shoe 18 will move away from disc 17 and free the adjacent end of arm 19'. Arm 19' pivots in the shoe 18 and is normally urged in a clockwise direction under the resilient action of the switch 19, specifically the pole arm 19a (Fig. 1). Switch pole arm 19a lifts and normally makes contact with the contact element 19b for a purpose later to be described. Interlocked or concurrent motion is obtained when the handle or lever 14 is pivoted in a clockwise direction (Fig. 2) to latch up with lever 10. At this time the shoe 18 contacts disc 17 and arm 19' will be moved counterclockwise to depress pole arm 19a to make contact at element 19c. From the foregoing it now appears that when handle 14 is unlatched from lever 10, switch pole 19a makes or closes with contact 19b which energizes the upper coil of relay 3, and when handle 14 and lever 10 are latched pole 19a makes or closes with contact 19c which energizes the lower coil of relay 3.

The disk 17 is provided with a lever 20 to which a rod 21 is pivotally connected at its one end and the opposite end of the rod 21 is connected to a lever 22 that operates a pair of switch operating cams 23, 23' mounted on a shaft 24 rotatably supported in appropriate bearings. A suitable casing 25 encloses the two cams and a pair of switches 26 and 27 mounted therein are operable by the cams 23, 23', respectively, which control circuits for the pitch change motor to be subsequently described.

A single-pole double-throw switch 19 selectively controls the energization of the two pole pieces of selector switch or relay 3 and the desired operation, either automatic or manual, for full declination or inclination of the rotor blade is controlled by the manually operable selector switch 4.

The selector relay 3, in connection with the lever 13 and its handle 14, selectively controls the reversing relay 6 and thereby the selective rotation of the reversible pitch changing motor 8.

The pitch of the rotor blade 9 is also controlled by the speed of the rotor 7 which is accomplished by means of a governor 28 operatively associated with the rotor and that controls a single-pole double-throw switch 29, which switch controls the reversing relay 5 also connected to the reversible motor 8.

A magnetic brake 30 is associated with the reversible motor 8 so that the motor will be held in any position to which it is adjusted by means of the throttle assembly 1 or the governor device 28. The brake is applied by means of spring 31 and is held in released position by solenoid 32 connected in series with either one of the windings of the reversible motor so that the instant the circuit is completed to either one of the motor coils, the brake is released and when the circuit is broken, the brake 30 will be applied and hold the motors stationary, thereby holding the rotor blade 9 in any adjusted position. The rotor blade 9 is actuated from the motor 8 by means of a train of gearings 33, one of which has a lever 34 connected thereto; and one end of a rod 35 is connected to the outer end of the lever 34 and the other end of the lever 35 is connected to lever 36 associated with the rotor blade 9.

In order that the motor 8 will be stopped at a predetermined position, means have been provided to break the power circuit to the motor when the predetermined position has been reached. This is accomplished by means of a suitable linkage connected to the casing 25 for the follow-up switch 2, which linkage consists of a rod 37 connected between the lever 34 and one arm of the bellcrank 38. A link 39 is connected between the other arm of bellcrank 38 and a lever 40 connected to the casing 25 of the follow-up switch 2. As previously indicated at link 21, the switch operating cams are connected to the disk 17 and as the casing 25 reaches its new position by means of the linkage 37, 39 during an adjustment of the rotor blade, the switch assembly 2 will adjust itself so as to neutralize or center the springs therein (to be described later), thereby centering the casing in relation to switches 26 and 27 at which time motor 8 will be deenergized. A pointer 41 connected to the disk visually informs the pilot of the angle of the pitch of the rotor blades.

The handle 14 and the lever 10 may normally be operated about a shaft 16 independently of each other, thereby enabling the pilot to control the pitch of the rotor blades and the throttling of the engine independently of each other but under most conditions of operation, it is desirable to move the engine throttle lever simultaneously with the pitch change lever for the rotor blade so that as the pitch of the rotor blade is increased there will be an increase in elevation or velocity of the helicopter, accompanied by a simultaneous increase in power from the engine and if there is a lowering or decrease in velocity of the helicopter, the power of the engine should be lowered as well as a decrease in the pitch of the blade to effect a lowering of the elevation or velocity of the helicopter. However, as indicated, it is frequently desirable to perform both functions simultaneously and for that reason, the latch 15 is provided on lever 10 so that when the handle 14 is moved toward the lever 10, they will be latched together to thereby enable the throttle assembly 1 to operate as a unit. Assuming that it is desired to increase the pitch of the rotor blade from the operating condition illustrated in Fig. 1 of the drawings and the fuel supply to the engine, the handle 14 and the lever 10 are latched together and moved in the direction of the arrow marked "up." As soon as the levers have been latched together, the single-pole double-throw switch 19 will be positioned so that the lower coil of selector relay 3 will be energized. When lever assembly 1 is rotated about shaft 16, the switch 26 will be closed and conductors 42 and 43 will be energized and conductor 44 circuit will be open. It is noted that lever 14 can pivot in a plane normal to lever 10 and that switch 19 normally is in circuit making position with conductor 44 until lever 14 is moved into latched position with lever 10. The single pole of this switch is actuated by the arm 19' and is moved counterclockwise as its inner end strikes the disc 17, as shown in Fig. 2. Movement of lever 14 toward lever 10 will close one side of switch 19 and movement in the opposite direction will close the other side of switch 19. The movement here intended is in a direction perpendicular to or at least not parallel with movement about the axis of shaft 16.

The closing of switch 26 by cam 23 energizes the conductor 45 and the conductor 46 is thereby ultimately energized following the energization of the lower coil of the reversing switch or relay 6, thereby causing the pitch control motor to operate so as to increase the pitch of blade 9. While this action is going on, the casing 25 of the follow-up switch 2 is being rotated by linkage 37, 38, and 39 and when the proper position of cam 23 relative to switch 26 is reached, the switch 26 will be opened, thereby stopping the motor 8 and enabling spring 31 to reset the brake and hold the rotor blade in adjusted position. Assuming that it is desired to decrease the pitch of the rotor blade 9, then the latched handle assembly 1 is rotated in the direction of the arrow marked "down" which will reversely rotate the follow-up switch assembly 2 so that the switch 27 is closed. The conductor 47 is now energized to thereby energize the upper coil of the reversing relay switch 6, energizing the conductor 49 and thereby reversely operating the motor 8. As soon as the blade has been adjusted to the desired pitch, the switch 27 will be opened through linkage 37, 38, 39 and casing 25, thereby stopping rotation of the motor 8, simultaneously de-energizing the solenoid 32 and enabling the spring 31 to re-apply the brake to the motor.

The rate of rotation of the helicopter rotor can also control the pitch of the blade when the selector switch 4 is set at automatic (shown) and the lever 14 is freed from lever 10 so that switch 19 energizes the upper coil of relay 3 through conductor 44. Now, assuming that the rotor is operating too rapidly, the switch 29 will be moved (Fig. 1) in such direction as to be closed so that the lower coil of the reversing relay 5 is energized, thereby energizing conductor 50 to rotate the reversing motor 8 in the direction to increase the pitch and when the speed of the rotor has been decreased sufficiently, the switch 29 will be opened, thereby breaking the circuit to the lower coil of the relay 5 and allowing the motor 8 to stop and be held in that position by the brake 30. Assuming that the rotor is operating too slowly, the switch 29 will be moved to a position so that the upper coil of the reversing relay switch 5 is energized, thereby energizing the conductor 51 rotating the pitch change motor 8 in the opposite direction.

The function of the selector switch 4 is to enable the pilot to cause the entire system just described to be subject to either manual or automatic control. When positioning the adjustable lever 52 of the switch to automatic position, the action just described will be performed. At certain times it may be desirable to adjust the rotor blades to either fully inclined position or fully declined position whereupon the control lever 52 will be moved to the contacts marked "dec." or "inc." providing switch 19 is closed, that is closed to energize the upper coil of the relay 3, as the immediate requirements may necessitate and when the lever 52 is moved to the "off" position, then the upper coil of relay 3 is rendered inoperative to condition the system for automatic control. Thus, only the automatic control circuit is de-energized. The last described condition is desirable when the pilot wishes to take over pitch control. A suitable source of energization, such as a battery 53, is provided which operates the reversing motor 8 and selectively operates each of the several relays described.

A modified control system is illustrated in Fig. 3 from which selector relay 3 and the rotor controlled relay 5 have been omitted. All of the parts in Fig. 3 that are found in Fig. 1 are similarly numbered and the operation of the retained parts is identical with that previously set forth. However, the rotor switch 29 controlled by the governor 28 does not cause the rotor blades to be adjusted in response to the particular speed and power requirements for any given altitude or position. In this modification, the function of the switch 29 is that of a low speed safety switch so that if the speed of the rotor should decrease to a point of danger, the switch 29 will be adjusted to the upper position thereof causing the motor 8 to position the blade 9 to horizontal or minimum pitch position, thereby placing the rotor in position for auto-rotation. The two levers selectively control the throttle and pitch by the elimination of latch 15, thereby making the pitch and throttle control subject only to the desires of the pilot.

The servo or follow-up switch 2 is more completely detailed in Figs. 5-8. The cams 23 and 23' have associated therewith but not rigidly connected thereto, levers 54 and 55, respectively, engageable with stops 56, 57 and 58, 59, respectively, secured to the inner surface of housing 25. A centering mechanism 60 is connected in the manner illustrated between each cam and housing so that levers 54 and 55 will be normally urged against stops 57 and 58 in which position the switches 26 and 27 will be open. The cams 23 and 23' are provided with suitable surface formations engageable with the movable members 61 and 62 of switches 26 and 27 in order to operate the latter. When lever 14, 20 in either Figs. 1 or 3 is rotated in either direction, one or the other of levers 54 and 55 will be moved away from stops 57 and 58. When the pitch of the rotor blade 9 has been adjusted to the desired position, linkage 37, 40 will have rotated housing 25 relative to shaft 24 so that the members 61 and 62 occupy the space 63 between the cam configuration. The switches are so positioned that the motor 8 circuits are open in this position and at the same time levers 54 and 55 again engage their cooperating stops 57 and 58. The lever 41, operatively associated with shaft 24, indicates the blade pitch and centering device 60 keeps the levers and stops in contact with each other. Motor 8 stops instantaneously when members 61 and 62 are aligned in space 63 because of the snap action of switches 26 and 27 mounted in housing 25. The stops 56 and 59 constitute limit stops for possible rotational movement of the cams relative to housing 25. Therefore, the pilot, by means of the servo or follow-up switch, has complete assurance that the blade pitch will be adjusted to the exact position desired in either direction of adjustment.

What I claim is:

1. A helicopter rotor pitch control comprising a rotor provided with an adjustable pitch blade; means for rotating said blade about its longitudinal axis for changing the pitch thereof; an engine for driving the rotor; a reversible motor for operating said rotor blade rotating means; means for controlling the direction of rotation of said motor; means for throttling the engine; means for jointly operating said last two mentioned means; a manually adjustable switch for causing the pitch change motor to respond to rotor speed and throttle adjustment, to move the blade to fully inclined or to fully declined position; and a servo switch responsive to throttle adjustment and to rotor blade adjustment for controlling the operation of said reversible motor.

2. A helicopter comprising a rotor provided with an adjustable pitch blade; an engine for driving the rotor; a reversible motor for changing the pitch of the blade; means for controlling the direction of operation of said motor; manually operable switch means selectively operating said motor in response to rotor operating conditions or to adjust the blade to fully inclined or declined position; a throttle for the engine; means for actuating said throttle; a follow up switch jointly operable by said throttle actuating means and said blade for determining the degree of operation of said reversible motor; and means for clutching said throttle actuating means to said motor controlling means to thereby jointly actuate each of said means.

3. A helicopter comprising a rotor provided with an adjustable pitch blade; an engine for driving the rotor; means for rotating the blade about its longitudinal axis for changing the pitch thereof; a reversible motor for operating said blade pitch changing means; means for controlling the direction of rotation of said motor; a throttle for the engine; means for adjusting said throttle; means for jointly operating said motor control means and said throttle; means responsive to the rate of rotation of said rotor for controlling the pitch of the rotor blade; a manually adjustable switch for causing the pitch change motor to respond to rotor speed and throttle adjustment, to move the blade to fully inclined or to fully declined position; and a servo switch responsive to throttle adjustment and to rotor blade adjustment for controlling the operation of said reversible motor.

4. A helicopter comprising a rotor provided with an adjustable pitch blade; an engine for driving the rotor; a reversible motor for changing the pitch of the rotor blade; means for controlling the direction of rotation of said motor; a throttle for the engine; means for actuating said throttle; means for clutching said throttle actuating means to said motor controlling means to thereby jointly actuate each of said means; a manually adjustable switch for causing the pitch change motor to respond to rotor speed and throttle adjustment, to move the blade to fully inclined or to fully declined position; and a servo switch responsive to throttle adjustment and to rotor blade adjustment for controlling the operation of said reversible motor.

5. A helicopter comprising a rotor provided with an adjustable pitch blade; an engine for driving the rotor; a reversible motor for changing the pitch of said blade; means for controlling the direction of rotation of said motor; a throttle for the engine; means for adjusting said throttle; means for jointly operating said motor control means and said throttle control means; means responsive to the speed of the rotor for controlling the pitch of the rotor blade; a manually adjustable switch for causing the pitch change motor to respond to rotor speed and throttle adjustment, to move the blade to fully inclined or to fully declined position; and a servo switch responsive to throttle adjustment and to rotor blade adjustment for controlling the operation of said reversible motor.

6. A helicopter rotor pitch control comprising a rotor provided with an adjustable pitch blade; an engine for driving the rotor; a reversible motor for changing the pitch of said blade; manually operable means for controlling the direction of rotation of said motor; means for throttling the engine; a follow up switch connected between said throttling means and blade pitch adjusting means for controlling the operation of said reversible motor; means for simultaneously actuating said engine throttling means and energizing said reversible motor for causing the pitch of said blade to be adjusted when the rotor speed drops below a predetermined value; and manually adjustable switch means for causing the pitch change motor to be automatically operable or to adjust the blade to fully inclined or declined position.

7. A helicopter rotor pitch control comprising a rotor provided with an adjustable pitch blade; an engine for driving the rotor; pitch changing mechanism for said blade; a reversible motor for actuating the pitch changing means for said rotor blade; means for controlling the direction of rotation of said motor; means for throttling the engine; means for jointly operating said last two mentioned means; means for arresting the rotation of said pitch adjusting motor when the blade has been adjusted to its proper pitch; circuit means for adjusting the rotor blade which includes switching mechanism for adjusting the blade to fully inclined position, fully declined position and for automatic operation in response to throttle adjustment or rotor speed; a follow up switching mechanism disposed between said throttle adjusting means and said pitch changing mechanism for controlling the operation of said pitch changing means; and means for indicating the pitch of the rotor blade.

8. A helicopter comprising a rotor provided with an adjustable pitch blade; an engine for driving the rotor; pitch changing mechanism for said blade; a reversible motor for actuating the pitch changing mechanisms for the blade; means for controlling the direction of operation of said motor; a throttle for the engine; means for actuating said throttle; means for clutching said throttle actuating means to said motor controlling means to thereby jointly actuate each of said means; means for arresting the rotation of said pitch adjusting motor when the blade has been adjusted to its proper pitch; circuit means for adjusting the rotor blade which includes switching mechanism for adjusting the blade to fully inclined position, fully declined position and for automatic operation in response to throttle adjustment or rotor speed; a follow up switching mechanism disposed between said throttle adjusting means and said pitch changing mechanism for controlling the operation of said pitch changing means; and means for indicating the pitch of the rotor blade.

9. A helicopter comprising a rotor provided with an adjustable pitch blade; an engine for driving the rotor; a pitch changing mechanism; a reversible motor for actuating the pitch changing mechanism for said blade; means for controlling the direction of rotation of said motor; a throttle for the engine; means for adjusting said throttle means for jointly operating said motor control means and said throttle; means for controlling the pitch of the rotor blade from the rate of rotation of the rotor; means for arresting rotation of said pitch adjusting motor when the blade has been adjusted to its proper pitch; circuit means for adjusting the rotor blade which includes switching mechanism for adjusting the blade to fully inclined position, fully declined position and for automatic operation in response to throttle adjustment or rotor speed; a follow up switching mechanism disposed between said throttle adjusting means and said pitch changing mechanism for controlling the operation of said pitch changing means; and means for indicating the pitch of the rotor blade.

References Cited in the file of this patent

UNITED STATES PATENTS

| Number | Name | Date |
|---|---|---|
| 1,146,204 | Pearce | July 13, 1915 |
| 2,155,586 | Ebert | Apr. 25, 1939 |
| 2,179,492 | Caldwell et al. | Nov. 14, 1939 |
| 2,187,364 | Ratie | Jan. 16, 1940 |
| 2,209,353 | Sachs | July 30, 1940 |
| 2,228,776 | Mullen | Jan. 14, 1941 |
| 2,242,314 | Martin et al. | May 20, 1941 |
| 2,293,912 | Mullen | Aug. 25, 1942 |
| 2,320,195 | Rindfleisch | May 25, 1943 |
| 2,346,007 | Chillson | Apr. 4, 1944 |
| 2,423,191 | Kopp | July 1, 1947 |
| 2,500,811 | Forsyth | Mar. 14, 1950 |

FOREIGN PATENTS

| Number | Country | Date |
|---|---|---|
| 671,248 | France | Aug. 31, 1929 |